United States Patent [19]

Eng et al.

[11] 3,968,022
[45] July 6, 1976

[54] ELECTROLYTIC CELL SEAL

[75] Inventors: Jeffrey D. Eng, North Vancouver; Cyril J. Harke, Burnaby; Primo Bosa, Vancouver, all of Canada; Wilfredo E. Figueras, Amherst, N.Y.

[73] Assignee: Hooker Chemicals & Plastics Corporation, Niagara Falls, N.Y.

[22] Filed: Oct. 17, 1974

[21] Appl. No.: 515,741

[52] U.S. Cl. .............................. 204/279; 136/133; 136/168; 204/98; 204/254; 204/286; 277/116.2; 277/125
[51] Int. Cl.² ...................... C25B 1/26; C25B 9/00; C25B 9/02
[58] Field of Search ............. 204/254, 279, 286, 98, 204/128; 136/133, 168; 339/94 A; 277/115, 116, 116.2, 121, 125, DIG. 6

[56] References Cited
UNITED STATES PATENTS

| | | | |
|---|---|---|---|
| 1,642,224 | 9/1927 | Bowen | 136/168 |
| 2,692,907 | 10/1954 | Wallace | 136/133 X |
| 3,027,166 | 3/1962 | DeVienne et al. | 277/116 X |
| 3,037,928 | 6/1962 | Hass et al. | 204/286 |
| 3,223,425 | 12/1965 | Leman | 277/115 |
| 3,461,057 | 8/1969 | Kamarjan | 204/253 X |
| 3,515,661 | 6/1970 | Coulter et al. | 204/286 X |

OTHER PUBLICATIONS
Bass, S. L. et al., "Silicones as Electrical Insulating Materials," in *The Electrochemical Society*, Preprint 90–19, 10/46, pp. 266–272.

*Primary Examiner*—John H. Mack
*Assistant Examiner*—A. C. Prescott
*Attorney, Agent, or Firm*—Peter F. Casella; Herbert W. Mylius

[57] ABSTRACT

A seal for preventing passage of fluid through an opening in an electrolytic cell wall through which a conductor for carrying electricity to or from a cell electrode passes includes as elements thereof a portion of the cell wall opening which is tapered so as to be larger at the outer part of the wall than at the inner part, silicone rubber in the narrower tapered opening part, an electrolyte-resistant rubber, such as neoprene, in the wider tapered opening part and means for pressing such rubber against the silicone rubber so as to help seal the silicone rubber against the tapered cell wall and the conductor. Preferably, the seal is a gastight seal and prevents hydrogen from escaping into the atmosphere from the catholyte compartment of an electrolytic cell for the electrolysis of brine. Such a cell is preferably an externally connected (by conductors) bipolar cell but the invention is adaptable for use in sealing off openings in the cell walls between the electrolyte compartments of internally connected bipolar cells and for monopolar electrolytic cells too.

6 Claims, 2 Drawing Figures

U.S. Patent  July 6, 1976  3,968,022
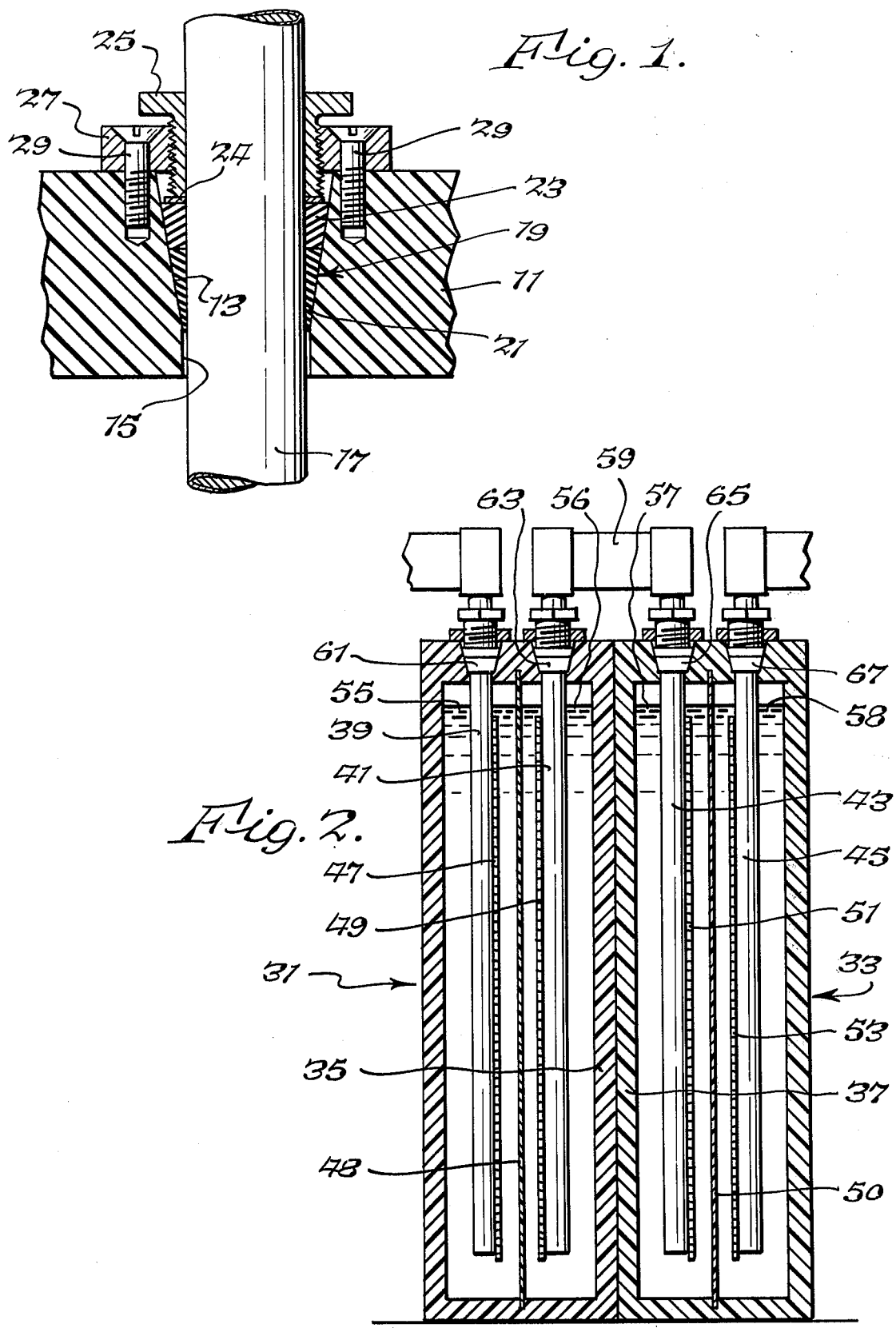

ELECTROLYTIC CELL SEAL

This invention relates to the prevention of leakage of fluid through openings in electrolytic cell walls through which conductors for carrying electricity to cell electrodes pass. More particularly, it relates to sealing means for such passages which are especially adapted for long-term sealing, for maintaining a seal to prevent escape of light gases, such as hydrogen, and for holding such seal despite expansions and contractions of body materials of the electrolytic cells in which the seals are employed.

In electrolytic cells means are provided for communicating electricity to the various electrodes employed. Normally, in monopolar cells and externally connected bipolar cells, wherein the external connections are employed to conduct electricity from the cathodes of prior cells in the series (with respect to the flow of the direct current) to the anodes of subsequent cells, such connections are usually made externally of the cell, principally at the top thereof and therefore, conductors conducting electricity to or from such connections from or to the electrodes pass through openings in the cell walls and have clearances left between them and such openings. Such a clearance is necessary to allow for ready insertion of the conductors through the openings and to provide for positioning the electrodes. Similarly, internally connected bipolar cells will have openings to be sealed to prevent undesirable communications between fluids of different cells and will have inlet and outlet conductors, for the first and last cells of the series, communicating the interiors of the cells with the external electric circuit. Thus, electrical connection openings in the cell walls are created which have to be sealed to prevent undesirable escape of electrolyte or products of electrolysis. Perhaps the most serious aspect of the problem is to prevent the escape of hydrogen from the catholyte compartment. This is so because hydrogen, due to its low molecular weight, is the most difficult to contain and is also highly flammable and explosive.

In accordance with the present invention a seal for preventing passage of fluid through an opening in an electrolytic cell wall through which a conductor for carrying electricity to a cell electrode passes comprises a portion of a cell wall having a tapered opening therein which is larger at the outer part of the wall than at the inner part, silicone rubber in the narrower tapered opening part, an electrolyte-resistant rubber in the wider tapered opening part and means for pressing such rubber against the silicone rubber so as to help tightly seal the silicone rubber against the wall and the conductor. The seal is especially useful for preventing escape of a gas such as hydrogen from an electrolytic cell, such as an externally electrically connected bipolar cell, and a preferred electrolyte-resistant rubber used in neoprene. Also within the invention are modified structures of the seal, a method for its manufacture and a method of electrolyzing brine in a cell without allowing escape of any hydrogen between the conductors and cell wall openings through which they pass.

The invention will be readily understood from the following description, taken together with the drawing in which:

FIG. 1 is a central vertical sectional elevation of a conductor for carrying electricity to or from a cell electrode and passing through a cell wall, illustrating the seal mechanism for preventing loss of fluid through the opening in the cell wall; and FIG. 2 is a partial central vertical sectional elevation, illustrating the top portions of a pair of externally connected bipolar electrolytic cells, with the present seals in place.

In FIG. 1 there is shown body portion 11 of an electrolytic cell for the electrolysis of brine, which body portion has a tapered wall 13 tapered so that the larger open end thereof is nearer to the outside of the cell and the smaller end is nearer to the inside. At the narrow, inner end of the opening formed, at the end of the taper, the wall portion 15 is untapered, as shown, and is cylindrical, with the axis thereof (and the axis of the tapered opening or tapered wall portion) being parallel to that of cylindrical conductor 17, which conducts electricity from a cathode in the electrolytic cell, not shown, through a connector, not shown, to another conductor, not shown, for carrying the electricity to the anode of an adjacent cell, not shown, which is in bipolar relationship with the present cell. A seal 19 is composed of a silicone rubber part 21 and a neoprene part 23, both of which fill an opening between the cell wall and the conductor. In the embodiment illustrated the silicone rubber portion extends inwardly toward the interior of the cell, sealing off the opening between the conductor and the cell wall, and also forms a thin annular seal between the conductor and the cylindrical, untapered cell wall section. Atop the silicone rubber and electrolyte-resistant rubber, such as neoprene, which are in the tapered opening between the conductor and the cell wall, are means for pressing the rubber against the silicone rubber so as to help to seal the silicone rubber tightly against the wall and the conductor, thereby preventing passage of fluid and even preventing the leakage of hydrogen gas through the opening. Such means include: a washer 24 or similar structure for transmitting the tightening forces evenly to the neoprene and silicone rubber; an adjusting nut or packing nut 25 for tightening down on the washer and pressing it against the neoprene and a collar or plate 27, fastened to cell body portion 11 by fastening means 29, which may be screws, as illustrated. The adjusting nut and the collar are threaded so that as the nut is turned it presses harder or more softly, as desired, against washer or annulus 24, thereby allowing control of the degree of compressibility of the silicone rubber and the neoprene.

In the portions of the bipolar cells shown in FIG. 2, for the sake of clarity some parts have been shown somewhat schematically and others, such as feed inlets, product take-offs and mechanical means for fastening the cells together, and particular structures, such as gaskets, for sealing off various openings in the cells or located where cell parts are joined together, have been omitted. Bipolar, membrane-type electrolytic cells 31 and 33 for the electrolysis of brine are illustrated in FIG. 2 in side-by-side, joined relationship with walls 35 and 37 thereof in contact. Instead of using separate walls 35 and 37, as illustrated, the cells may be produced so that only one cell includes such a wall member and the other is held to it by a peripheral gasket and is tightened in place, thereby preventing any loss of electrolyte or electrolysis products. Conductors 39, 41, 43 and 45 conduct electricity to electrodes 47, 49, 51 and 53, respectively, with electrodes 47 and 51 being anodes and electrodes 49 and 53 being cathodes. Cation-active permselective membranes 48 and 50 divide the cells into anode and cathode compartments. Anolytes 55 and 57 and catholytes 56 and 58 are present in the cells. Between cells 31 and 33 electrical connectors 59 transmits electricity from the cathode conductor 41 of the first cell to anode conductor 43 of the second cell. Sealing means 63 and 67 of this invention prevent the passage of hydrogen gas out of the cells through openings between the cathode conductors 41 and 45 and the cell walls and sealing means 61 and 65 prevent the leakage of chlorine through corresponding openings between the anode conductors 39 and 43 and the cell walls.

Referring back to FIG. 1, cell body 11 may be of any suitable material for such construction, which is resistant to the electrolyte and is sufficiently rigid and of satisfactory other structural characteristics so that it does not objectionably expand, contract or deteriorate during electrolysis of brine or other material treated, but it is highly preferred to utilize a synthetic organic polymeric plastic material such as a poly-lower alkylene, of which the best is a polypropylene. The polypropylene may be a mixture of homopolymer and copolymer and preferably includes a suitable filler, of which asbestos, calcium silicate fibers and mica flakes are preferred. The proportions of filler to polymer will normally be in the range of 1:10 to 1:1.5, with 1:5 to 1:2 being preferred.

The tapered portion of cell wall 13 will normally extend through more than half the thickness of the wall and will usually have a tapered length of from 1 to 10 centimeters, preferably 3 to 5 cm. The tapered wall 13 is usually at an angle of from 5° to 20°, preferably 7° to 12° and most preferably about 9° to 10° with respect to the axis of the corresponding opening and of the conductor. While various other cross-sectional shapes may be employed, such as pyramidal shapes, which in cross-section are square, octagonal or rectangular, or distorted frustoconical sections, such as elliptical, it is preferred that the openings be frustoconical, as it is preferred that the conductor be cylindrical, rather than of shapes corresponding to the cross-sections already mentioned. At the narrower end of the taper the cell wall preferably continues parallel to the conductor and with a clearance between the conductor and the cell wall of about 0.3 to 1.5 mm., preferably 0.5 to 1 mm. The silicone rubber which fills the lower tapered part of the opening between the conductor and the tapered cell wall is of a length of 0.1 to 10 times the length of the other electrolyte-resistant rubber, e.g., neoprene, preferably 0.5 to 3 times such length, and the distance beyond the narrow end of the taper, from it to the inside of the cell wall (not the clearance) is 0.2 to 5 times the length of the tapered silicone rubber section, preferably 0.3 to 2 times such length. Although the wall of the cell in this "extension" may be only substantially parallel to the conductor, it is preferred for it to be exactly or almost exactly parallel. In tightened position, the silicone plus neoprene occupy about 50 to 95%, preferably 70 to 85% of the length of the tapered opening, with the pressing or tightening means being in the remainder of the tapered opening, which is of greater diameter.

Atop the neoprene rubber hollow frustoconical section is a washer of suitable material, preferably nylon, although steel, polypropylene and other sufficiently strong structural materials may also be employed. Nylon collars and adjusting screws are also used, as are nylon fastening screws, although these may also be steel, brass, polypropylene or other such suitable material of construction.

The most critical materials employed are primarily the silicone rubber and secondly, the electrolyte-resistant rubber, which is preferably neoprene. Silicone rubbers are well known and are described at length under the heading *Silicone Elastomers* in the 1973–1974 Modern Plastics Encyclopedia at pages 102 and 107. The preferred silicone elastomers utilized are unfilled, solventless, general purpose, adhesive-sealant materials which are vulcanizable at room temperature by moisture, usually within a period of from one hour to one day. Among such materials, the presently most preferred commercial product that is used is a general purpose silicone rubber paste made by Dow Corning Corporation and sold under the trademark Silastic 732 RTV, which is an adhesive-sealant capable of forming strong bonds between silicone rubber parts and almost all surfaces, including neoprene, wood, paper, masonry and etched Teflon. Such silicones, when cured, are serviceable from −60° to +200°C. Instead of Silastic 732 RTV silicone rubber adhesive-sealant there may be employed other such Silastic products, either as the silicone rubber, cured before installation or after, adhesives, mixed with chopped silicone rubber and cured in place or of other elastomeric properties which make them suitable for maintaining their springy properties under electrolytic cell operating conditions at elevated temperatures and in the presence of corrosive media. However, it is much preferred to utilize in situ cured silicone rubbers which, by virtue of their initial fluidity can fill any irregularites in the conductor and cell walls and can conform very closely to such parts. Such properties can also be obtained from the use of Silastic silicone elastomer Type A, a very pure silicone used for medical purposes, including human implants. The silicone rubbers can, because of their elastomeric properties, expand or contract as desired to compensate for expansions and contractions of other cell parts, without breaking the seal made. Typical silicone rubber properties include tensile strengths of 1,000 to 2,000 kg./sq. cm. and ultimate elongations of 60 to 300%. The present silicone rubbers may have such properties or may be softer, having lower tensile strengths and even greater ultimate elongations.

The most preferred silicone rubbers for use in this invention have been described and are mentioned in the Dow Corning Corporation Bulletin entitled *Engineering with Silastic Brand Silicone Rubber*, copyrighted 1963 and 1965, which is incorporated herein by reference. Also incorporated by reference are the Modern Plastics Encyclopedia pages previously mentioned, page 784 of the Condensed Chemical Dictionary, Eighth Edition, published by Van Nostrand Reinhold Company in 1971, and U.S. Pat. Nos. 3,529,035 and 3,629,358. The silicone elastomers that are most useful in the practice of this invention normally have durometer hardnesses lower than those of the neoprenes with which they are employed, e.g., from 40 to 55 but in suitable instances other hardnesses are acceptable, up to 85 to 90 Shore A durometer points. Similarly, permanently soft silicone sealants are useful.

The electrolyte-resistant rubber employed may be any suitable rubber, including natural rubber in some instances, butyl rubber, SBR, nitrile rubbers, polysulfide rubbers and polychloroprene rubbers but of these the neoprenes are most highly favored. They may be filled with carbon black or other fillers but unfilled rubbers are also excellent. Although the materials for transmitting the compressive force to the silicone rubbers have been characterized as "rubbers", other rubber-like polymers such as polyurethanes, polytetrafluoroethylenes and similar compounds may also be employed. Similarly, in place of the silicone rubbers, modifications thereof such as fluorinated silicones may sometimes be useful.

The neoprene or comparable rubber is normally not preferably made in situ. It is usually cut to shape before installation. The method of making and installing the present seal will be described later.

The anode conductor will preferably be a cylindrical titanium-clad copper rod and the cathode conductor will preferably be a copper rod. The connector at the top of the cell will usually be copper for lowest resistance but titanium-clad copper and other conductive materials may also be used. While the seals are normally installed on an upper wall of a cell such installation may be on other walls through which conductors pass from the cell exterior to an electrode. The cells may be bipolar or monopolar and if bipolar are preferably externally electrically connected. Still, they may be used for making internal connections between the cathode of one cell and the anode of the next.

In a modification of the structure of FIG. 1 an internal bipolar cell connector is made according to the present invention. It is of the same appearance as that of FIG. 1 except that the conductor, carrying electricity from the cathode to the next anode, passes through the side of the cell and a side of the adjoining cell, with the tapered opening being through both sides or, if only a single side is present, with the next cell being tightly joined to the first cell to prevent leakage. The tapered opening is like that of FIG. 1 in either case. The upper or outer portion of the seal of FIG. 1 corresponds to the anode side of the internal conductor-connector. Because a portion of the conductor will be in the catholyte area the rod will be copper, not titanium clad, on the catholyte side and halfway through the silicone rubber deposit in the cell wall and the rest of the rod, passing into the anolyte side, will be titanium clad copper, with the outside diameter of the titanium equaling that of the unclad copper. Care will be taken to have silicone rubber on both sides of the dividing line between the clad and unclad conductor sections and preferably equal lengths will be present on each side. Instead of using nylon and steel parts for the adjusting nut, collar, washer and fastening screws these will preferably be of acid resistant material, e.g. polyethylene, polypropylene.

The invention may be utilized for holding conductors in fluid-tight or gas-tight contact in a variety of electrolytic cells but is intended primarily for use in membrane cells for the production of chlorine and caustic, wherein the membrane is a cation-active membrane membrane of the type characterized as a hydrolyzed copolymer of a perfluorinated hydrocarbon and a fluorosulfonated perfluorovinyl ether. Alternatively, a sulfostyrenated perfluorinated ethylene propylene polymer may be used. However, other cation-active permselective membranes are also available and usable, although they are not as useful.

The present seals are made by installing the conductor, with electrode attached, in place in the electrolytic cell with the conductor passing through the desired tapered opening in a wall thereof. After the electrode has been satisfactorily positioned the silicone rubber, preferably as an unfilled, room temperature vulcanizable, general purpose adhesive-sealant composition of suitable fluidity, is filled into the desired portion of the tapered opening and a previously formed neoprene "cap", bored to fit the conductor, is inserted in place, followed by the parts of the means for tightening. The neoprene "stopper" is coated with a thin layer, e.g., 0.2 mm., of a silicone grease, such as Dow Corning Corp. High Vacuum Grease Silicone Lubricant on its bored or internal and tapered external surfaces to facilitate movement and avoid distortions during tightenings. The adjusting screw is turned until the silicone rubber is extruded from the bottom of the annulus and the silicone is allowed to cure for a period of from ½ hour to 24 hours, usually from 3 to 6 hours, preferably while the cell assembly is being made. During the curing period the cell may be fastened together with other cells in a cell assembly, normally containing from 10 to 60, preferably 20 to 50 individual cells. In some cases, where it is not thought necessary to provide such an excellent sealant structure for the anodes, the anode openings may contain only a neoprene part, corresponding to that identified by numeral 23 in FIG. 1 (although it may be lengthened). It has been found that excellent sealing is sometimes not required to prevent leakage of chlorine.

The electrolytic cell is operated in the same way as other membrane chlorine-caustic cells, utilizing the same voltages, temperatures, current densities designs and materials of construction (other than those previously described). Accordingly, it is not considered necessary to set forth such conditions except to note that normally the voltage drop in a cell will be from 2.3 to 6 volts, the current density will be from 0.2 to 0.5 ampere/sq. cm., the operating temperature will be from 65° to 105°C and the caustic produced, which will be drawn off continuously (and water is added as make-up for it), will be of a sodium hydroxide concentration of from 5 to 45%, preferably 10 to 30%.

The following examples illustrate the practice of the invention but do not limit its scope. Unless otherwise mentioned all temperatures are in °C. and all parts are by weight.

EXAMPLE 1

An electrolytic cell like one of those of FIG. 2, including the seal of FIG. 1, is operated to generate chlorine, aqueous caustic solution and hydrogen. The cell body is of polypropylene filled with 20% of asbestos fibers and 10% of mica flakes. The polypropylene is a mixture of homopolymer and copolymer, with about equal parts of each. The seal of FIG. 1 is utilized for both anode and cathode connections, with the conductors in each case being 2.5 cm. in diameter, that for the anode being of titanium clad copper and that for the cathode being copper. The anode is ruthenium oxide on expanded titanium mesh and the cathode is steel mesh. The cylindrical opening between the frame and the cylindrical conductor rod is 0.7 mm. and extends for about 1 cm. with the tapered portion of the opening being at an angle of 9° 20' and extending 3.3 cm. The angle of the taper is normally 5° to 20° but angles as high as 30° or 40° may also be employed in some circumstances. The silicone rubber is Silastic adhesive-sealant 732 RTV, made by Dow Corning Corp. and the neoprene is of about 45 durometer, although durometer hardnesses of 30 to 60 or 70 are also usable. The length of the silicone rubber is about 1.5 times that of the neoprene, when compressed, and the total of silicone rubber and neoprene occupies about 80% of the tapered opening, when compressed, with the pressing means in the remainder thereof. The collar, adjusting nut and washer are all of polypropylene, which is sufficiently strong to maintain its structural integrity during compression and use. Before assembly of the seal the neoprene part is coated with a thin layer, 0.2 cm. thick, of Dow Corning Corp. High Vacuum Grease Silicone Lubricant on its internal and tapered external surfaces to facilitate movement thereof and to avoid distortions during tightening. The thickness of the applied layer of grease is usually in the range of 0.1 mm. to 1 mm. The seal is assembled by the method previously described in the specification.

The cell is operated at a voltage drop of about 4.1 volts, a current density of about 0.3 ampere/sq. cm. and a temperature of about 90°C., with the anolyte pH at about 3 to produce a caustic solution of about 12% sodium hydroxide content. In a variation of the experiment the Nafion DuPont cation-active permselective membrane is held against the anode and the anode is activated on the side away from the membrane, under which condition the operating voltage is lowered to 3.8. In a further modification a series of 50 cells, connected in a manner such as that illustrated in FIG. 2, except for a common wall between each cell, is similarly operated, with copper connectors between the conductors. Also, instead of using the bipolar arrangement illustrated, monopolar cells with seals of the described type are operated. However, externally connected bipolar cells require less copper and for this reason, among others, are usually more advantageous.

In the experiments described the conductor rod and the attached electrode are held firmly in place without leakage of either chlorine from the anolyte compartment or hydrogen from the catholyte compartment. The seals are maintained tight during long periods of use of the cell, e.g., six months to one year, and do not lose their resilience nor usually require additional tightening during such period. However, if desired, they may be tightened or installed as shown in the drawing.

The described apparatus and the method utilized have several important advantages which contribute to their special utilities. The electrical connections between electrodes are made in an air environment and therefore are less subject to corrosion and short circuiting. The seal itself is in the gas phase of the cell, with part being in contact with the atmosphere. Thus, the conductor and the electrical connector are not as subject to corrosion as would be the case were they in liquid phases. Crevice corrosion is reduced. The structure of the seal and the materials employed are such that it maintains its elasticity and presses tightly against the conductor and the cell body walls to prevent leakage. The additional annulus below the taper indicates when the tapered portion is completely full of silicone rubber (the silicone is extruded to the interior of the cell). It also helps to hold the conductor in desired position and has additional sealing effects. The taper is capable of evenly tightening the conductor in place and the silicone fills all irregularities and conforms to the contacted parts well during extended uses of the cells. The invention does not require any flanges or internal sheet seals adjacent the flanges. The components of the invention are simple to assemble and use, trouble-free in operation and comparatively inexpensive. Accordingly, they represent an advance over prior methods of sealing such conductors to cell body parts.

EXAMPLE 2

The device of Example 1 is installed as an internal connector for a bipolar electrolytic cell which is otherwise of the type and materials described in Example 1, except for changes hereby indicated. Such changes include having the portion of the conductor from the middle of the silicone section to the catholyte of copper, with the rest of it being of titanium clad copper and with the outside diameters being the same. Also, the washer, collar and adjusting nut are made of polypropylene. Such seal operates effectively to prevent leakage of liquid from one electrolyte compartment to the next.

In a modification of the invention the taper flares outwardly at both sides of the intermediate cell wall (a single wall). Thus, the silicone rubber is of a double frustoconical shape, with narrow ends of the frustums meeting. Two sets of neoprene parts are employed and two sets of compressing means are utilized. The seal is a satisfactory one and operates effectively during the electrolysis of brine in such a cell. Such design is also employed in the cells of Example 1 and is found to be effective, although it is usually not necessary and because it includes additional pieces, the seal of Example 1 is preferred.

EXAMPLE 3

In a comparative experiment the silicone rubber is omitted from the seal of FIG. 1 about the cathode, with only the neoprene being employed. In such case there is some escape of hydrogen and therefore the neoprene stopper alone is unsatisfactory. However, it is sometimes employed to seal off the anolyte compartment since the molecular weight of chlorine is higher and it does not escape as easily through openings in the neoprene seals.

EXAMPLE 4

When the seals of FIG. 1 are utilized in other electrolytic cells, such as those for the electrolysis of water and hydrochloric acid they work equally effectively. In some such cases the other rubbers mentioned may be employed and different silicone elastomers, such as those previously described, are substitutable and give good sealing results.

The invention has been described with respect to illustrations of preferred embodiments thereof but is not to be limited to these since it is evident that one of skill in the art with the present specification before him will be able to employ substitutes and equivalents without departing from the scope of the invention.

What is claimed is:

1. A seal for preventing passage of fluid through an opening in an electrolytic cell wall through which a conductor for carrying electricity to a cell electrode passes which comprises a portion of a cell wall having a tapered opening therein which is larger at the outer part of the wall than at the inner part, silicone rubber in the narrower tapered opening part, an electrolyte-resistant rubber in the wider tapered opening part and means for pressing such rubber against the silicone rubber so as to help tightly seal the silicone rubber against the wall and the conductor.

2. A seal for an electrolytic cell according to claim 1 which is gas-tight and prevents escape of gas from the cell to the exterior thereof through an opening between the cell wall and the conductor, wherein the conductor is an external bipolar cell conductor, the taper of the opening is about 5° to about 20°, the electrolyte-resistant rubber is neoprene, the silicone rubber and neoprene fill the passage of fluid and the length of silicone rubber therein along the conductor is 0.1 to 10 times the length of the neoprene.

3. A gas-tight seal according to claim 2 wherein the cell wall at the narrow end of the taper continues for a distance from 0.2 to 5 times the length of the silicone rubber substantially parallel to the conductor and with a clearance between the conductor and the wall of from 0.3 to 1.5 mm.

4. A gas-tight seal according to claim 3 wherein the taper of the opening is at an angle of about 7° to 12°, the length of the silicone rubber is 0.5 to 3 times the length of the neoprene, the cell wall at the narrow end of the taper continues for a distance 0.3 to 2 times the length of the silicone rubber, substantially parallel to the conductor, the clearance between the conductor and the wall is from 0.5 to 1 mm., the means for pressing the neoprene against the silicone rubber includes a washer and a packing nut or adjusting nut pressing against the washer and the conductor is cylindrical.

5. A gas-tight seal according to claim 4 wherein the neoprene rubber is of about 30 to 70 durometer hardness, the cell is an electrolytic cell for the manufacture of chlorine, aqueous sodium hydroxide solution and hydrogen by the electrolysis of brine, and a threaded plate or collar about the conductor is affixed to the exterior of the cell and the adjusting nut is of a matching thread and is threadable in the collar to press more tightly against the washer and thereby more tightly to press the neoprene and silicone rubber against the wall of the opening through the cell and against the conductor.

6. A gas-tight seal according to claim 5 wherein the conductor is about 2.5 cm. in diameter, the clearance between it and the interior parallel wall portion of the cell is about 0.7 mm., the angle of the taper of the opening is of 9° to 10°, the length of the silicone rubber is about 1.5 times that of the neoprene rubber, the conductor and the center line of the opening in the cell wall through which it passes are substantially vertical and the conductor is connected to a conductor of an adjacent cell external to the cells.

* * * * *